United States Patent
Ni et al.

(10) Patent No.: US 9,008,286 B2
(45) Date of Patent: Apr. 14, 2015

(54) DYNAMICALLY GENERATED GRAPHICAL USER INTERFACE FOR INTERACTIVE VOICE RESPONSE

(71) Applicant: Verizon, Arlington, VA (US)

(72) Inventors: James J. Ni, Westford, MA (US); Elliot G. Eichen, Arlington, MA (US); Rafael A. Gaviria, Medford, MA (US); Rezwanul Azim, Arlington, MA (US); Gowtham Javaregowda, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/948,164

(22) Filed: Jul. 22, 2013

(65) Prior Publication Data

US 2015/0023484 A1 Jan. 22, 2015

(51) Int. Cl.
*H04M 11/00* (2006.01)
*H04M 3/51* (2006.01)

(52) U.S. Cl.
CPC .......... *H04M 3/5166* (2013.01); *H04M 3/5183* (2013.01)

(58) Field of Classification Search
CPC . H04M 3/5191; H04M 3/493; H04M 3/5166; H04M 2201/38; H04M 2201/42; H04M 2203/251; H04M 3/42042; H04M 3/5175; H04M 7/0009; H04M 7/0027; H04M 3/5183; H04M 2203/403; H04M 5/523; H04M 2203/253; H04M 2203/404; H04M 3/5232
USPC .................. 379/265.02, 88.04, 93.01, 88.01, 379/142.04, 218.01, 221.09, 266.1, 88.16, 379/88.18, 93.09, 93.17, 93.25, 379/265.01–265.09, 309
See application file for complete search history.

(56) References Cited

U.S. PATENT DOCUMENTS

| | | | | |
|---|---|---|---|---|
| 7,092,738 | B2 * | 8/2006 | Creamer et al. | 455/563 |
| 7,324,633 | B2 * | 1/2008 | Gao et al. | 379/88.18 |
| 8,428,228 | B1 * | 4/2013 | Baxter, Jr. | 379/88.14 |
| 8,520,830 | B2 * | 8/2013 | Singh et al. | 379/265.01 |
| 2014/0064463 | A1 * | 3/2014 | Reddy | 379/88.01 |

* cited by examiner

*Primary Examiner* — Akelaw Teshale (57) ABSTRACT

A device may be configured to receive information regarding a call center. The received information may include an interactive voice response ("IVR") menu configuration that includes contact information for contacts associated with the call center, and audible options to place a call to the contacts via the contact information for the contacts. The device may parse the IVR menu configuration to generate a graphical user interface ("GUI") menu configuration, which may comprise visual selectable options that correspond to the audible options. Selection of a particular one of the visual selectable options may cause a call to be placed to a particular contact that is associated with the particular visual selectable option. The device may further store or output the GUI menu configuration.

20 Claims, 11 Drawing Sheets

Contact us – please select one of the options below

| Place a new order |
| (wait time: 0 mins) |
| Place voice call     Play sound clip |

| Problem with your order > order not yet received |
| (wait time: 0 mins) |
| Place voice call    Place video call    Play sound clip |

| Problem with your order > defective items |
| (wait time: 0 mins) |
| Place voice call    Place video call    Play sound clip |

| Modify your order > add items |
| (wait time: 4 mins) |
| Place voice call     Play sound clip |

| Modify your order > cancel |
| (wait time: 3 mins) |
| Place voice call     Play sound clip |

| Operator |
| (wait time: 10 mins) |
| Place voice call |

DYNAMICALLY GENERATED GRAPHICAL USER INTERFACE FOR INTERACTIVE VOICE RESPONSE

BACKGROUND

Companies often use interactive voice response ("IVR") systems to route telephone calls from customers to representatives that are relevant to customers' needs. IVR systems may make use of automated messages played back to users to represent menus and menu options, and may allow users to navigate the menus by providing vocal feedback and/or by pressing keys on a number pad.

DETAILED DESCRIPTION OF PREFERRED EMBODIMENTS

The following detailed description refers to the accompanying drawings. The same reference numbers in different drawings may identify the same or similar elements.

From the standpoint of entities that use IVR systems, these systems may be an efficient, low-cost technique for handling and routing telephone calls. However, from the standpoint of callers, these systems may prove problematic, in that using them may be time-consuming and ultimately frustrating. For example, a caller may need to listen to numerous irrelevant menu options before a relevant option is presented, which may be an inefficient use of the caller's time.

Some implementations described herein may provide an efficient, visual representation of menus that have traditionally been provided via audio-based systems, such as IVR systems. Using these menus, users may more quickly and efficiently choose the correct recipient of a call, thus potentially saving users time. In some implementations, the visual menus may also provide up-to-date information in real time, thereby allowing users to make educated decisions on whom to call, or when to place calls. For example, this up-to-date information may indicate an expected wait time for each potential call recipient. Companies that use such visual systems may realize a benefit by improving customers' user experience, thereby potentially increasing the goodwill of the company. Using such a visual interaction method, calling users are also able to provide more descriptive information about the purposes of their calls, via web interaction, while waiting for calls to be made or connected. Furthermore, users' inputs, feedbacks, and/or histories can also be immediately available to the call recipient so that the users can be served more efficiently.

Figure 1:
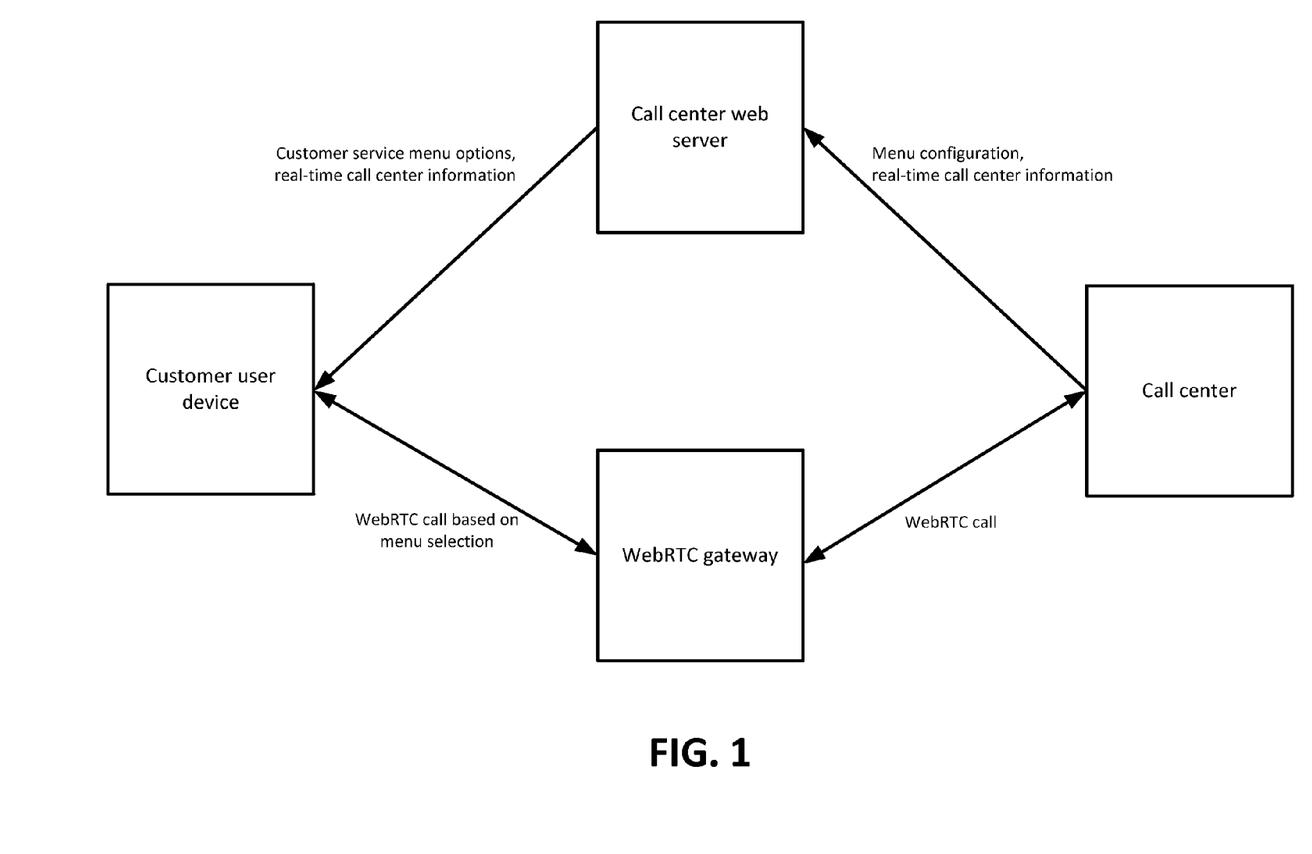
FIG. 1 illustrates an overview of one or more example implementations described herein.

As shown in FIG. 1, a call center web server may receive menu configuration information from a call center. This menu configuration information may, in some implementations, be a menu configuration file that is also used in IVR systems for the call center. In this sense, the call center web server may be capable of generating visual menus based on existing IVR menus, thus expediting setup of the visual menus of some implementations described herein. The call center web server may also, in some implementations, receive real-time call center information from the call center (e.g., expected wait times for different telephone numbers associated with the call center). The call center web server may also, in some implementations, collect user information (such as user ID/password, or other useful information) and retrieve history information, regarding users, from a history database.

The call center web server may generate visual menus, and may provide the visual menus to a customer user device. For instance, the customer user device may be a desktop computer or a smartphone associated with a customer who wishes to call the call center. The call center web server may, for example, provide the visual menus in the form of, or as part of, a web page provided in response to a request from the customer user device. As described further below, the menus may provide information regarding various potential call recipients, associated with the call center, which the customer may call. In some implementations, the customer user device may be capable of making a call to the call center using a Web Real-Time Communications ("WebRTC") application programming interface ("API"), which may be facilitated by a WebRTC gateway.

As mentioned above, visual presentation of menus may simplify and expedite the user experience in navigating menus that are traditionally presented via IVR systems. For instance, FIG. 2 conceptually illustrates a set of menus that may be presented via IVR. As shown, a user may be presented initially with a main menu, and given four options, each corresponding to a key press between 0 and 3. Upon pressing 0, for instance, the user may be presented with an audio message ("message A"), and the user's call may be routed to a particular telephone number ("TN1"). Upon pressing 3, the user may be presented with another audio message ("message C"), which may correspond to another set of options that are presented to the user. Assume that the user desires to eventually call the telephone number that corresponds to the following sequence of key presses: 3, 1, 2. The user would have to listen to the entirety of message C, message F, and message K before the call is routed to the telephone number which the user ultimately desires to call, which may be time-consuming and frustrating from the point of view of the user.

Figure 2:
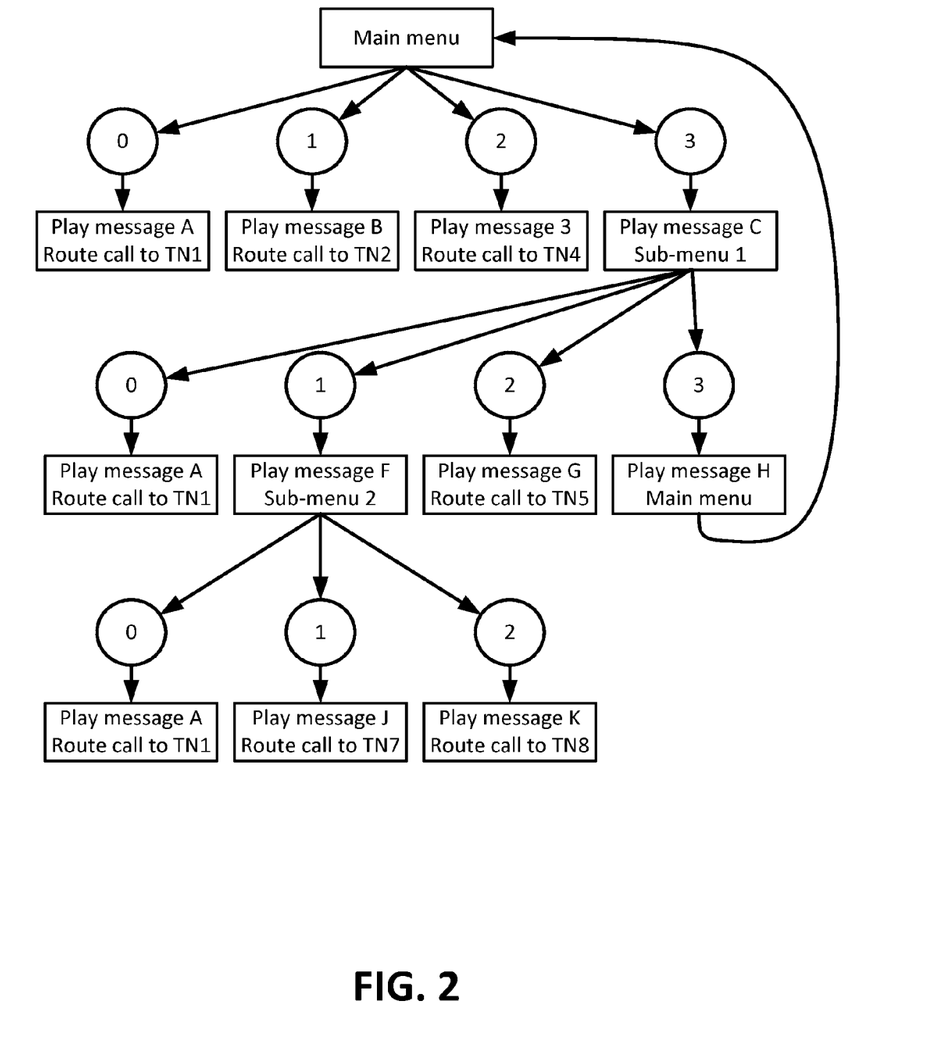
FIG. 2 conceptually illustrates an example menu that may be difficult to navigate via IVR.
Figure 3A:
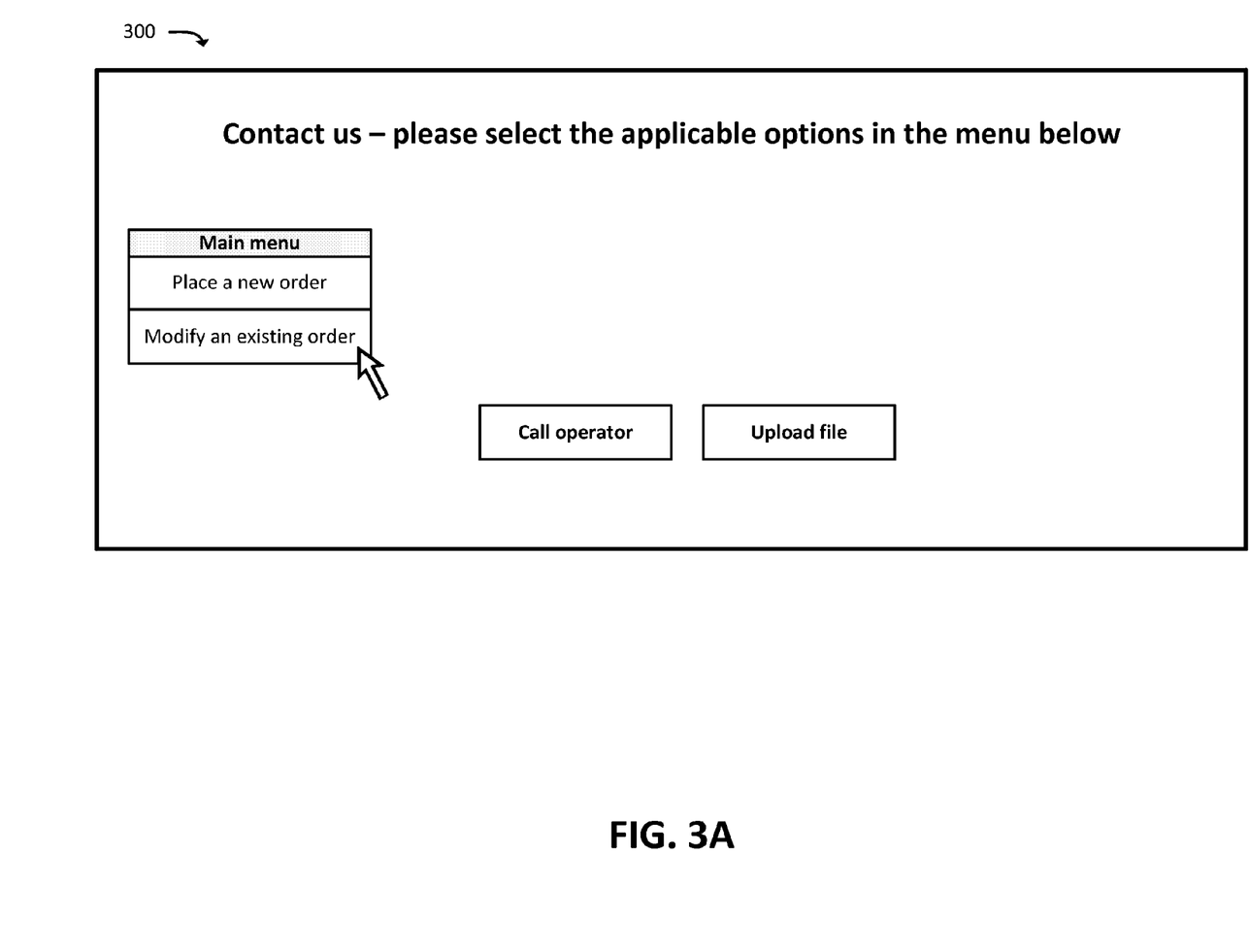
FIGS. 3A-3C illustrate an example of a graphical user interface ("GUI") that may more conveniently present contact options to a user than traditional IVR systems.
Figure 3B:
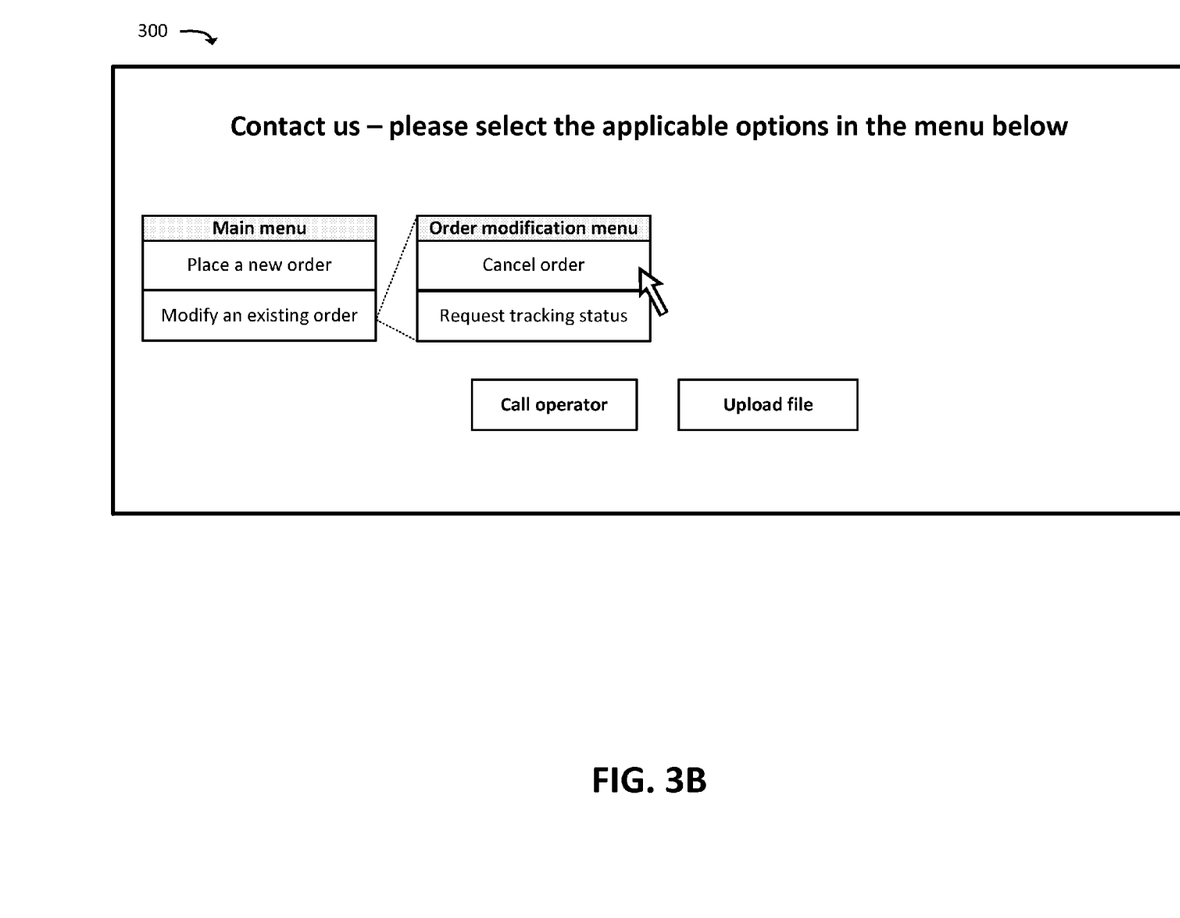
Figure 3C:
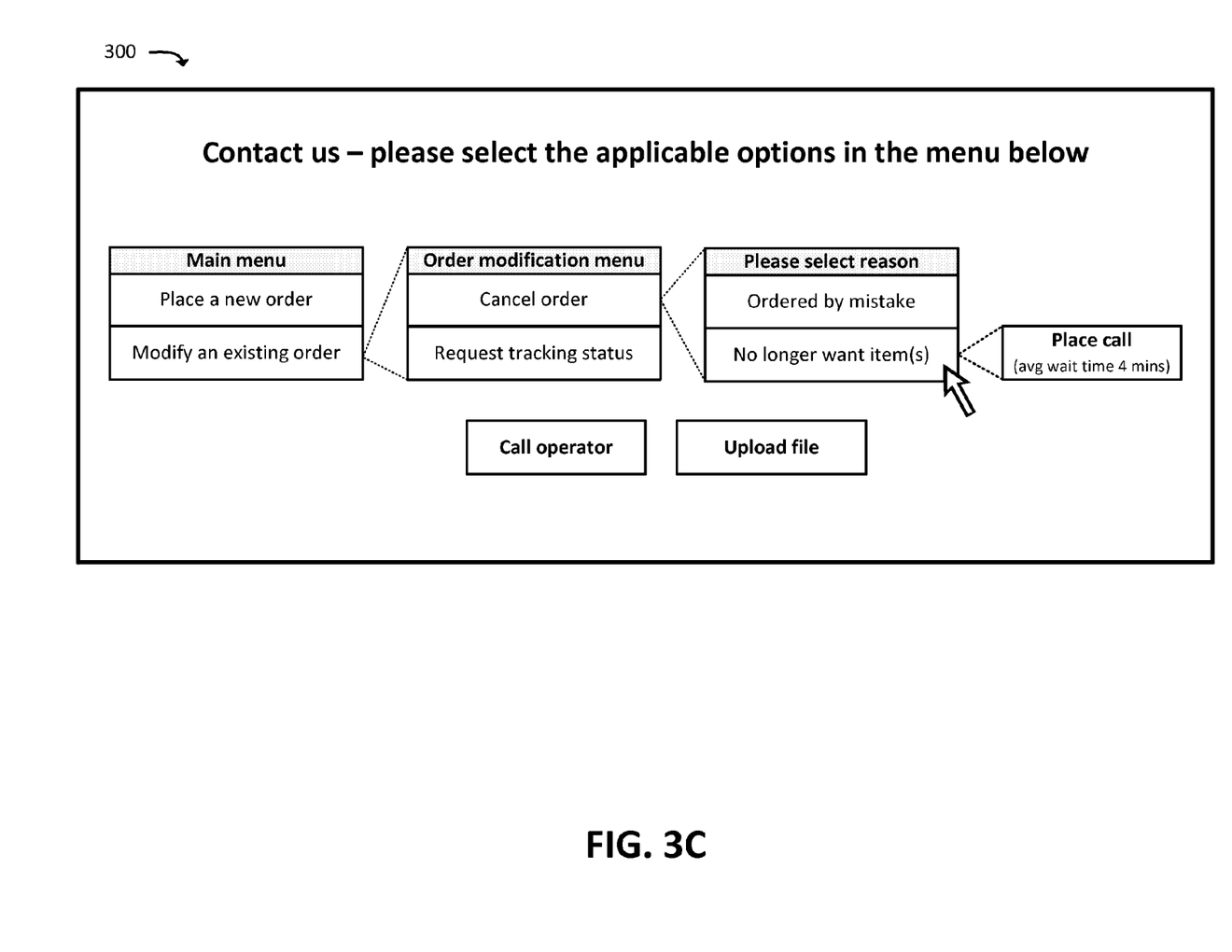

FIGS. 3A-3C illustrate an example GUI 300, which may be presented to the user in accordance with some implementations. The GUI may include a set of menus and sub-menus, which may correspond to the options shown in FIG. 2. For instance, as shown in FIG. 3A, GUI 300 may initially include a menu that corresponds to the top-level menu ("Main menu") shown in FIG. 2. The menu options "Place a new order" and "Modify an existing order" may correspond to, for example, options 1 and 2 under the main menu. The "Call operator" option, shown in FIG. 3A, may be presented separately from the menu, and may correspond to option 0 in FIG. 2. The call center web server may determine, for example, that the same telephone number (i.e., TN1, shown in FIG. 2) may be present in several different menus, and may therefore present an option to call that telephone number as a separate option that is not necessarily a part of the menus.

As further shown in FIG. 3A, an "Upload file" button may be present. Using this option, a user may upload a file (e.g., a video clip, an audio clip, an image, a text document, and/or another type of file). In some implementations, the call center web server may receive this file from the user's device, store the file until the user's call is connected, and provide the file to the recipient (e.g., via a data connection, via email, or via another transmission technique).

As shown, assume that a user selects "Modify an existing order." The selection of this option may yield a sub-menu, the "Order modification menu" shown in FIG. 3B. This sub-menu may correspond to, for example, "Sub-menu 1," shown in FIG. 2. As shown, assume that the user selects the option "Cancel order," which may correspond to option 1 under sub-menu 1 in FIG. 2. As shown in FIG. 3C, the selection of the "Cancel order" option may yield yet another sub-menu, "Please select reason." This sub-menu may correspond to, for instance, "Sub-menu 2," shown in FIG. 2. As further shown in FIG. 3C, assume that the user selects the option "No longer want item(s)." This option may correspond to, for example, option 2 under sub-menu 2, shown in FIG. 2. As shown in FIG. 2, this option may correspond to the telephone number "TN8." As shown in FIG. 3C, the user may be presented with the option to place a call, which may be a call to the telephone number "TN8." As further shown in FIG. 3C, the average wait time ("4 mins") may be displayed with the "Place call" option. As may be apparent from FIGS. 3A-3C, a user's navigation of a previously long and complicated IVR menu may be simplified and expedited by presenting the same options in a visual manner. Additionally, at each step, a user may be allowed to input as much necessary supporting information as possible in the form of text, pictures, video clips, files, or other types of information. Based on the provided information, a call recipient may view provide personalized service to the user, thus improving the user's experience.

Figure 4:
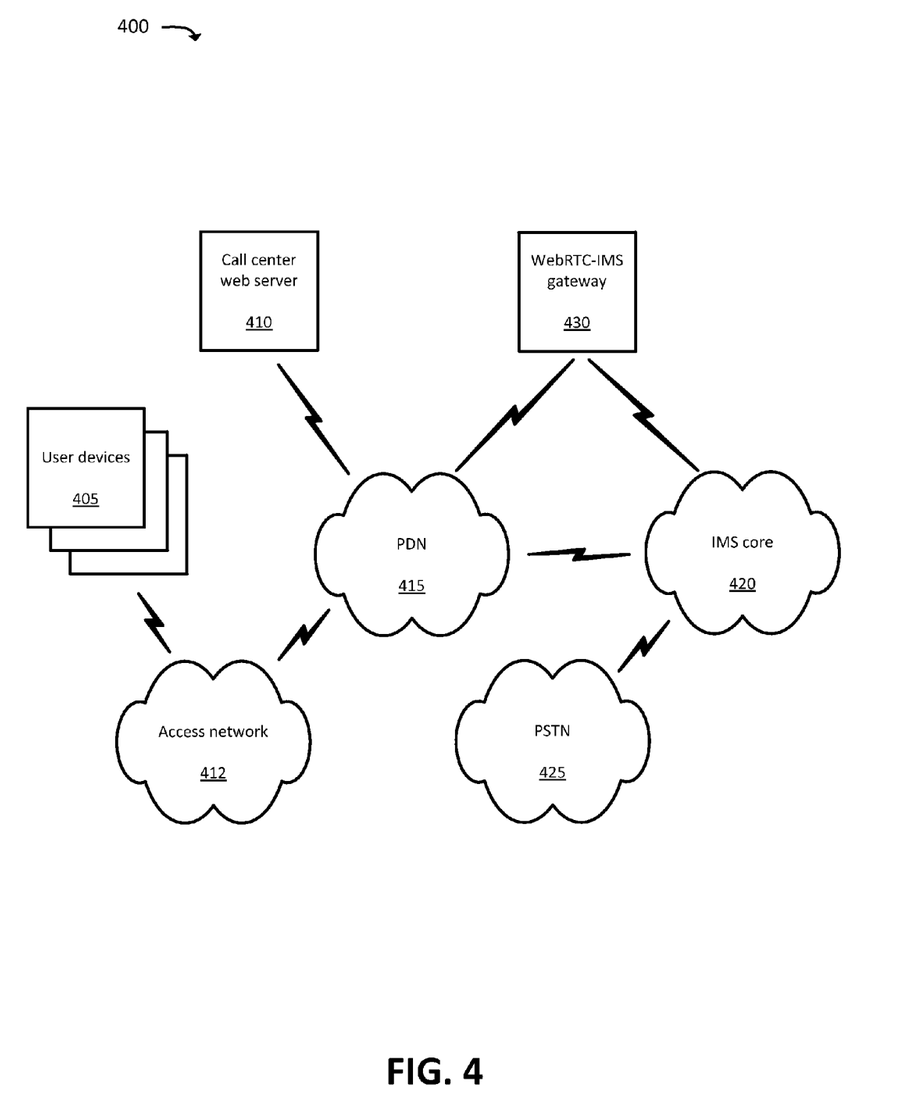
FIG. 4 illustrates an example environment in which systems and/or methods, described herein, may be implemented.

FIG. 4 illustrates an example environment 400, in which systems and/or methods described herein may be implemented. As shown in FIG. 4, environment 400 may include one or more user devices 405 (hereinafter referred to collectively as "user devices 405," or individually as "user device 405"), call center web server 410, access network 412, PDN 415, IMS core 420, PSTN 425, and WebRTC-IMS gateway 430. The quantity of devices and/or networks, illustrated in FIG. 4, is provided for explanatory purposes only. In practice, there may be additional devices and/or networks; fewer devices and/or networks; different devices and/or networks; or differently arranged devices and/or networks than illustrated in FIG. 4. Alternatively, or additionally, one or more of the devices of environment 400 may perform one or more functions described as being performed by another one or more of the devices of environment 400. Devices of environment 400 may interconnect via wired connections, wireless connections, or a combination of wired and wireless connections.

User device 405 may include any computation and communication device that is capable of directly or indirectly communicating with one or more networks, such as PDN 415, IMS core 420, PSTN 430. In some implementations, user device 405 may communicate with PDN 415, IMS core 420, or PSTN 430 via one or more access networks, such as access network 412. User device 405 may include, for example, a desktop computer, a laptop computer, a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a tablet computer, a camera, a personal gaming system, or another type of computation and communication device. In some implementations, user device 405 may execute one or more software applications, such as a web browser that is capable of communicating via data connections (e.g., a data connection that is based on a WebRTC API).

In some implementations, a particular user device 405 may be associated with a user (e.g., a customer), who wishes to place a call to a call center using a graphical menu. In some implementations, another user device 405 (or a set of user devices 405) may be associated with a call center, which receives calls from user devices 405 associated with users.

Call center web server 410 may include any computation and communication device that generates graphical menus based on IVR-based menus, and provides these graphical menus to one or more user devices 405. As will be further described, call center web server 410 may additionally receive real-time status information from a call center (e.g., from user devices 405 associated with the call center, from another device, and/or from a user associated with the call center), and may present the real-time status information to users. In some implementations, call center web server 410 may receive a file from user device 405 (e.g., a user device associated with a caller), and may provide the file to another user device 405 (e.g., a user device associated with a call center).

Access network 412 may include one or more wired and/or wireless networks, via which user device 405 may communicate with other networks (such as with PDN 415). Access network may, in some implementations, include a radio access network ("RAN") that is associated with an evolved packet system ("EPS") that includes a LTE network and/or an evolved packet core ("EPC") network that operate based on a Third Generation Partnership Project ("3GPP") wireless communication standard. The RAN may include one or more base stations, some or all of which may take the form of an evolved node B ("eNB"), via which user device 405 may communicate with the EPC network. The EPC network may include one or more serving gateways ("SGWs"), PDN gateways ("PGWs"), and/or mobility management entities ("MMEs"), and may enable user device 405 to communicate with PDN 415 and/or IMS core 420. In some implementations, access network 412 may additionally, or alternatively, include other types of networks, such as a wired Local Area Network ("LAN"), a wireless LAN, and/or another type of network.

PDN 415 may include one or more wired and/or wireless networks. PDN 415 may include, for example, a wide area network ("WAN") such as the Internet, or one or more other packet-switched networks. User device 405 may connect, through PDN 415, to other networks, data servers, application servers, or other servers/applications that are coupled to PDN 415.

IMS core 420 may include one or more computation and communication devices that implement IMS functionality of a long term evolution ("LTE") network. IMS core 420 may include, for example, one or more Call Session Control Function ("CSCF") devices, a Home Subscriber Server/Authentication, Authorization, and Accounting ("HSS/AAA") server, and/or other devices. The CSCF may facilitate the establishment and de-establishment of media sessions. The CSCF may communicate with devices outside of IMS core 420 using, for example, SIP and/or MSRP messages. The HSS/AAA server may assist in the provisioning of network resources for IMS subscribers and IMS-based services.

PSTN 425 may include a circuit-switched network that allows for communication between devices. For instance, PSTN 425 may allow for communication between traditional landline telephones.

WebRTC-IMS gateway 430 may include any computation and communication device that facilitates communication between user device 405 and IMS core 420. For example, WebRTC-IMS gateway 430 may translate messages, sent from user device 405 to IMS core 420, from WebRTC messaging to a messaging protocol that is supported by IMS core 420 (e.g., Session Initiation Protocol ("SIP") and/or Message Session Relay Protocol ("MSRP")), and vice versa. In some implementations, WebRTC-IMS gateway 430 may be incorporated as part of IMS core 420, may connect to IMS core 420 via PDN 415, or may communicate with IMS core 420 in another fashion.

Figure 5:
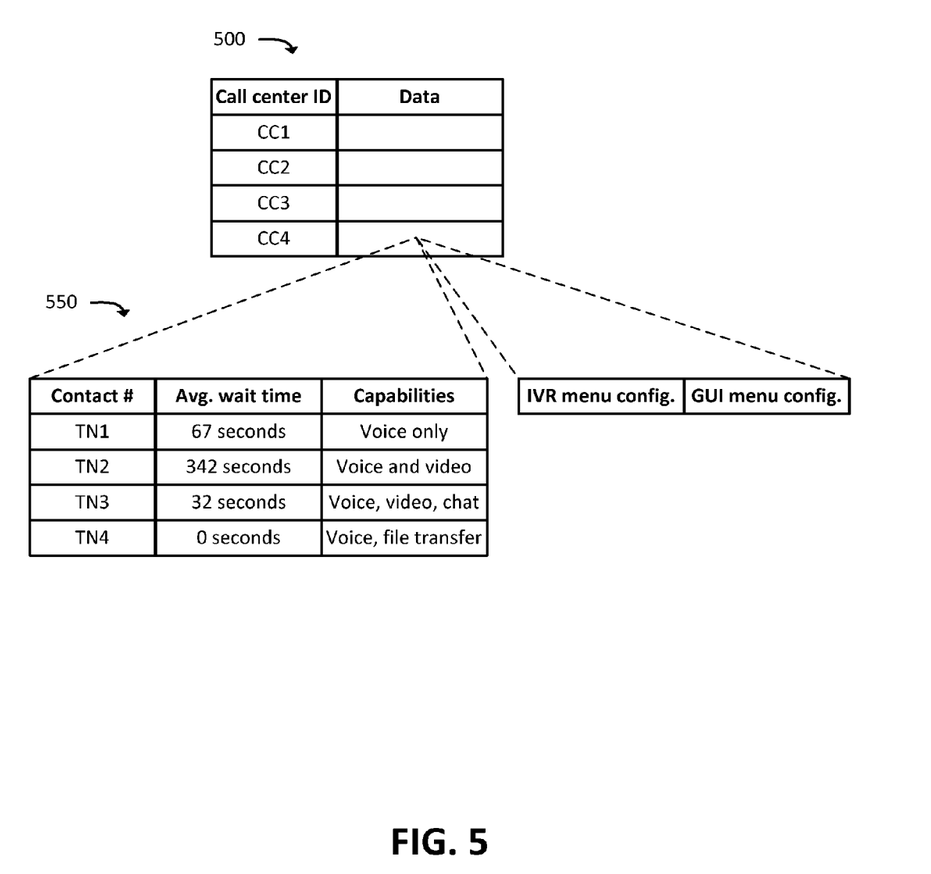
FIG. 5 illustrates an example data structure that may be stored by a call center web server.

FIG. 5 illustrates an example data structure 500 that may be stored by call center web server 410. Data structure 500 may include information regarding call centers. For instance, data structure 500 may include information identifying various call centers ("Call center ID"), such as telephone numbers, names, and/or other information. Data structure 500 may also include data for each call center. For example, data structure 500 may include an instance of data structure 550 for each call center, as well as an IVR menu configuration and a GUI menu configuration for each call center.

As shown in FIG. 5, example data structure 550 may correspond to call center "CC4." Data structure 550 may include information regarding several contact numbers ("Contact #") associated with call center CC4, average wait times associated with the contact numbers, and capabilities of the contact numbers. The contact number field, for a particular contact, may specify contact information (e.g., a telephone number, an Internet Protocol ("IP") address, a Uniform Resource Locator ("URL"), and/or another identifier), which may be used to reach the particular contact. The "average wait time" field may specify an average amount of time a user may be expect to wait before a live operator is available to communicate with the user. The "capabilities" field may indicate technological capabilities of a respective contact number. For example, one contact may be capable of only voice calls, while other contacts may be capable of voice, video, chat, file transfer, and/or other capabilities. In some implementations, the "capabilities" field may indicate protocols (e.g., application-level protocols), via which a particular contact is capable of communicating.

In some implementations, the data stored in data structure 550 may be periodically or intermittently received from a device that determines, on an on-going basis, real-time information associated with a call center. For example, some or all of the data stored in data structure 550 may be received from a device that periodically or intermittently determines wait times associated with various numbers associated with contact numbers of a call center. In some implementations, some or all of the data stored in data structure 550 may be received from a user (e.g., an administrator, an operator, and/or another user) associated with a corresponding call center.

The IVR menu configuration for a particular call center may conceptually resemble, for example, the IVR menu tree shown in FIG. 2. In some implementations, the IVR menu configuration may be in the form of an Extensible Markup Language ("XML") file, and/or another type of file. In some instances, the IVR menu configuration may conceptually be viewed as a finite state machine ("FSM"), in that a user may traverse the IVR menu one state at a time, with defined pathways (e.g., key press options) from state to state. In some implementations, the IVR menu configuration, stored in data structure 500, may be the same as information used by an IVR system. In some implementations, the IVR menu configuration information may include assets, such as audio files, which may be played when certain options are selected.

The GUI menu configuration, for a particular call center, may be information that specifies graphical menus that may be presented to users. In some implementations, call center web server 410 may automatically generate a GUI menu configuration based on an IVR menu configuration. For instance, as described below, call center web server 410 may parse the IVR menu configuration in order to generate visual menus that are convenient for a user to traverse. In some implementations, generating a GUI menu configuration based on an IVR menu configuration may include identifying menus and sub-menus, determining options specified in the IVR menu configuration, identifying duplicate options, removing options, and/or other actions, as will be described further below.

While example implementations of data structures 500 and 550 are described above, other variations are possible in practice. For instance, in some situations, one particular call center web server 410 may be associated with one particular call center. In these situations, call center web server 410 may not store data structure 500, but may store an instance of data structure 550, as well as IVR menu configuration information and GUI menu configuration information for the call center. As another example, in some implementations, call center web server 410 may forgo storing IVR menu configuration information for a particular call center, and/or may forgo storing capability information for a particular contact.

Figure 6:
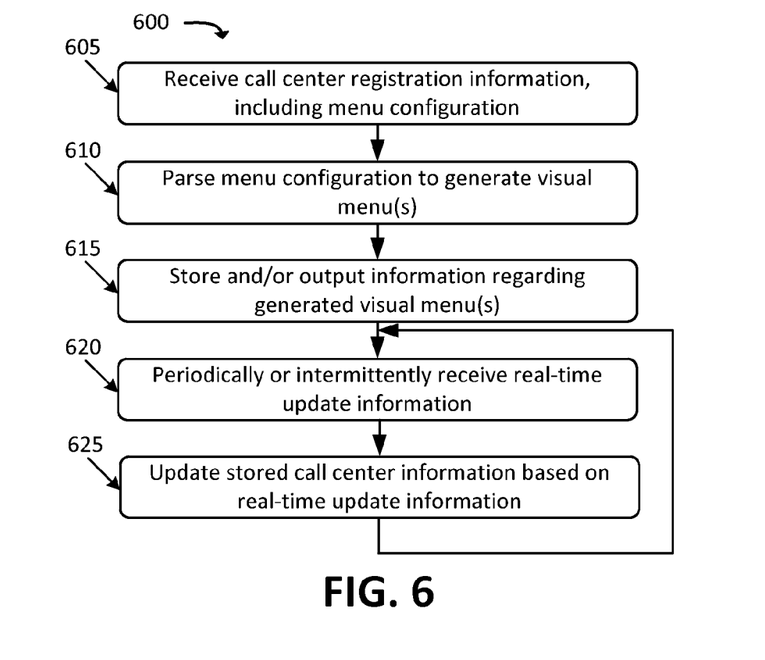
FIG. 6 illustrates an example process for registering a call center, and maintaining real-time information regarding the call center.

FIG. 6 illustrates an example process 600 for registering a call center, and maintaining real-time information regarding the call center. In one example implementation, process 600 may be performed by call center web server 410. In other implementations, some or all of process 600 may be performed by one or more other devices in lieu of, or in conjunction with, call center web server 410.

Process 600 may include receiving call center registration information, including menu configuration information (block 605). For example, call center web server 410 may receive registration information (e.g., from an administrator associated with call center web server 410, and/or programmatically via a software interface) regarding a call center. The registration information may include some or all of the information, for a particular call center, shown in FIG. 5. For instance, the registration information may include a telephone number (or an identifier associated with another mode of contact, such as an IP address, a URL, etc.) associated with the call center. In some implementations, the received registration information may also include IVR menu configuration information—that is, information that is used to configure an IVR system. In some implementations, this IVR menu configuration may be unmodified, as compared to IVR menu configuration information that controls an IVR system. As mentioned above, the IVR menu configuration may be in the form of, or may include, one or more XML files that specify an IVR menu configuration.

As also mentioned above, the registration information may also include information identifying call center contacts associated with the call center. These call center contacts may correspond to selectable options in the IVR menu configuration. In some implementations, the registration information may also include capability information for some or all of the contacts, which may indicate communication methodologies via which the contacts are able to communicate.

Process 600 may also include parsing the menu configuration information to generate one or more visual menus (block 610). For example, call center web server 410 may parse the IVR menu configuration, received at block 605, in order to generate a GUI menu configuration. With the exception of some circumstances, some examples of which are presented below, call center web server 410 may identify options in the IVR menu configuration, as well as options to take when those options are selected. For instance, some options may cause a telephone number to be called, while other options may cause another menu (e.g., a sub-menu) to be displayed. Some options may additionally, or alternatively, cause an audio file to be played.

As mentioned above, some exceptions may exist when generating a GUI menu configuration based on an IVR menu configuration. These exceptions may occur in order to more finely tailor the existing IVR menu configuration into a polished visual-based menu configuration. The following exceptions are examples of how call center web server 410 may parse the IVR menu configuration; however, in practice, other options are possible.

For example, in some implementations, call center web server 410 may identify and consolidate duplicate options that appear multiple times. For instance, call center web server 410 may identify that the same telephone number appears at multiple levels of the IVR menu. When generating the GUI menu configuration, call center web server 410 may include only a single menu option, which corresponds to the telephone number, as opposed to including multiple menu options. In some implementations, as shown in example GUI 300, this consolidated menu option may be presented separately from other menu options in the GUI. For example, the consolidated menu option may correspond to a general purpose "operator" contact.

In some implementations, call center web server 410 may identify menu options, in the IVR menu configuration, that would not make sense to include in a graphical menu. For example, call center web server 410 may identify IVR menu options that correspond to invalid user input (e.g., menu options that are tagged with "invalid_user_input," or other indicators of invalid user input), timeout delay (e.g., menu options that are related to a pre-set amount of time during which an option has not been selected), etc., and may forgo including these options in the GUI menu configuration.

In some implementations, call center web server 410 may identify options that cause an already-presented menu to be re-presented. For example, one particular option may correspond to repeating the current menu (e.g., "To repeat these options, press 9," or "To return to the main menu, press 7"). Call center web server 410 may forgo including these options multiple times, as it would be unnecessary to include the same menu multiple times in a visual-based menu configuration.

Process 600 may additionally include storing and/or outputting information regarding the visual menus (block 615). For instance, call center web server 410 may store the GUI menu configuration information (generated at block 610) in data structure 500, or may output the information to another device. In some implementations, call center web server 410 may generate and/or store executable code based on the generated GUI menu configuration. For example, in some instances, call center web server 410 may generate server-side executable code (e.g., Personal Home Page ("PHP") code, Java Servlet code, Active Server Pages ("ASP") code, etc.), that may include graphical menu elements, select object elements (e.g., buttons), and/or other GUI elements that represent the generated GUI menu configuration information. In some implementations, call center web server 410 may output the generated code to a developer, who may review and/or modify the code.

Process 600 may further include periodically or intermittently receiving real-time update information (block 620). For example, call center web server 410 may receive (on a regular basis, or in some implementations, on an irregular basis) information regarding a call center, or regarding individual call center contacts. This information may include, for example, average expected wait times associated with call center contacts within a call center.

Process 600 may also include updating the stored call center information based on the real-time update information (block 625). For example, call center web server 410 may update data structure 550 when real-time information is received (at block 620). As further shown in FIG. 6, blocks 620 and 625 may repeat, in order for real-time information regarding the call center to be continuously maintained.

Figure 7:
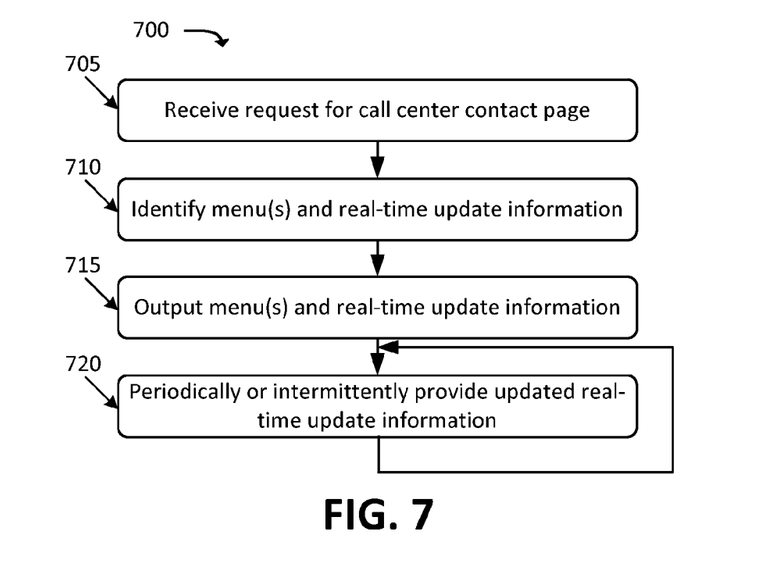
FIG. 7 illustrates an example process for outputting dynamically generated menus, as well as real-time call center information.

FIG. 7 illustrates an example process 700 for outputting dynamically generated menus, as well as real-time call center information. In one example implementation, process 700 may be performed by call center web server 410. In other implementations, some or all of process 700 may be performed by one or more other devices in lieu of, or in conjunction with, call center web server 410. For instance, in some implementations, some or all of process 700 may be performed by a web server that is separate from call center web server 410.

Process 700 may include receiving a request for a call center contact page (block 705). For instance, call center web server 410 (or another web server) may receive a request from user device 405 for a call center contact page. This request may correspond to, for example, a HyperText Transfer Protocol ("HTML") GET request, that includes a URL of a web page that includes contact information for a company. In some implementations, this web page may include code (e.g., client-side JavaScript or PHP code) that causes user device 405 (e.g., a browser running on user device 405) to communicate with call center web server 410, and to present information in a manner that is controlled by call center web server 410 (e.g., by server-side JavaScript or PHP code). In some implementations, the code may identify a call center associated with the call center contact page (e.g., may indicate a telephone number associated with the call center, a name of the call center, and/or another identifier that may be used to identify the call center).

Process 700 may also include identifying menus and real-time update information associated with the call center (block 710). For example, referring to the example shown in FIG. 5, call center web server 410 may identify a GUI menu configuration information and, in some implementations, other data (such as some or all of the information shown in data structure 550, and/or other data) regarding the call center. As mentioned above, the GUI menu configuration information may include code (e.g., server-side JavaScript or PHP code) that corresponds to a set of graphical menus.

Process 700 may additionally include outputting the menus and real-time update information (block 715). For example, call center web server 410 may execute the server-side code to present the graphical menus and real-time update information (e.g., information stored in data structure 550), according to the GUI menu configuration information.

Process 700 may further include periodically or intermittently providing updated real-time update information (block 720). For example, when real-time update information is received regarding the call center (or contacts within the call center), call center web server 410 may update the GUI presented to user device 405. In this manner, user device 405 may display information that is consistent with update information received or stored by call center web server 410.

Figure 8:
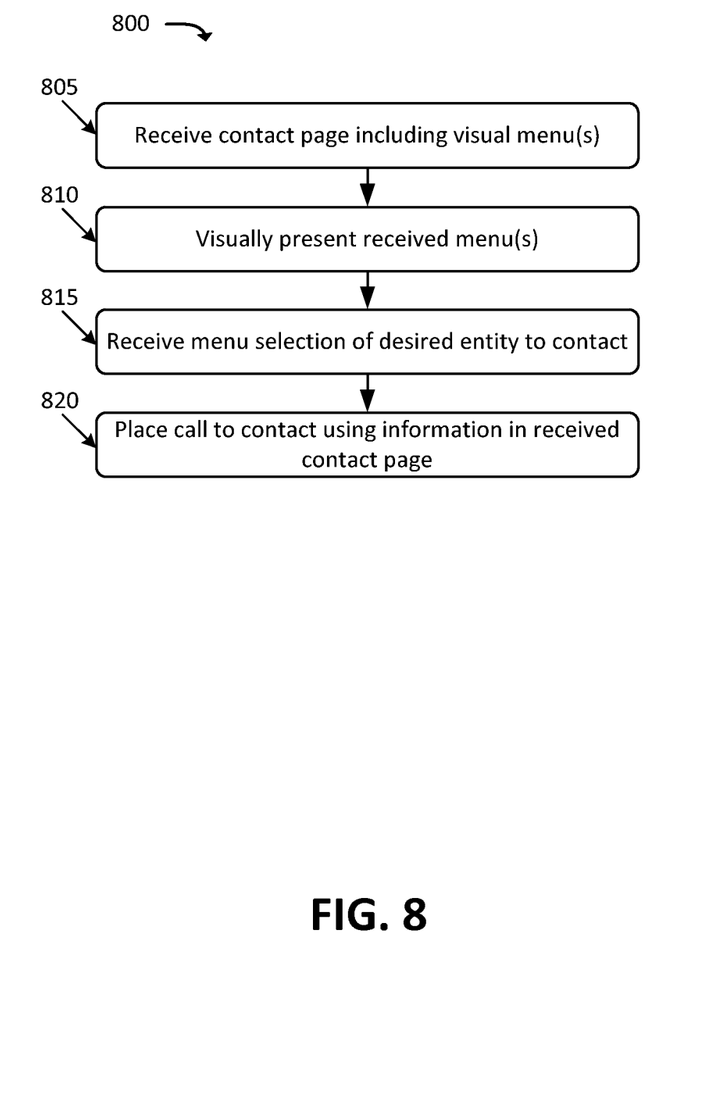
FIG. 8 illustrates an example process for placing a call using dynamically-generated call menus.

FIG. 8 illustrates an example process 800 for placing a call using dynamically-generated call menus. In one example implementation, process 800 may be performed by user device 405 (e.g., a user device associated with a user who wishes to call a call center). In other implementations, some or all of process 800 may be performed by one or more other devices in lieu of, or in conjunction with, user device 405.

Process 800 may include receiving a call center contact page, including visual menus (block 805). For example, user device 405 may receive a web page that includes a GUI, which includes menus pertaining to options to contact a call center. As described above with respect to FIG. 7, this web page may include client-side code (e.g., JavaScript, PHP, or other code) to display a GUI that is generated and/or presented by call center web server 410. The GUI may be similar to GUI 300, described above with respect to FIGS. 3A-3C; to GUI 900, described below with respect to FIG. 9; and/or another GUI.

Process 800 may also include visually presenting the received menus (block 810). For instance, user device 405 may visually present the received GUI, which includes the menu(s) included in the GUI configuration information associated with the received web page. In some implementations, user device 405 may present the GUI via a web browser and/or another software application running on user device 405 (e.g., a dedicated application that is used to place calls).

Process 800 may additionally include receiving a menu selection of a desired entity to contact (block 815). For instance, user device 405 may receive a selection of a contact within the call center that a user of user device 405 desires to call. As described above, this menu selection may be made by the user in a more expedient and convenient manner than if the user had been forced to listen to menu options via an IVR system.

Process 800 may further include placing a call to the contact information using information in the received contact page (block 720). For example, user device 405 may place a call according to the capabilities of the selected contact, as well as the capabilities of user device 405. For instance, if user device 405 is capable of placing a WebRTC call, and the selected contact is capable of multimedia (e.g., voice and video) calls, user device 405 may place a WebRTC call. In some implementations, when placing the WebRTC call, user device 405 may communicate with WebRTC-IMS gateway 430, which may facilitate communications between user device 405 and an IMS core (e.g., IMS core 420), which may itself ultimately facilitate communication between user device 405 and the selected contact. As another example, in some implementations, user device 405 may place a voice over IP ("VoIP") call to the selected contact. As yet another example, user device 405 may place a call (e.g., a voice call, a video call, and/or a chat session) to the selected contact using an over-the-top ("OTT") communication application.

Figure 9:
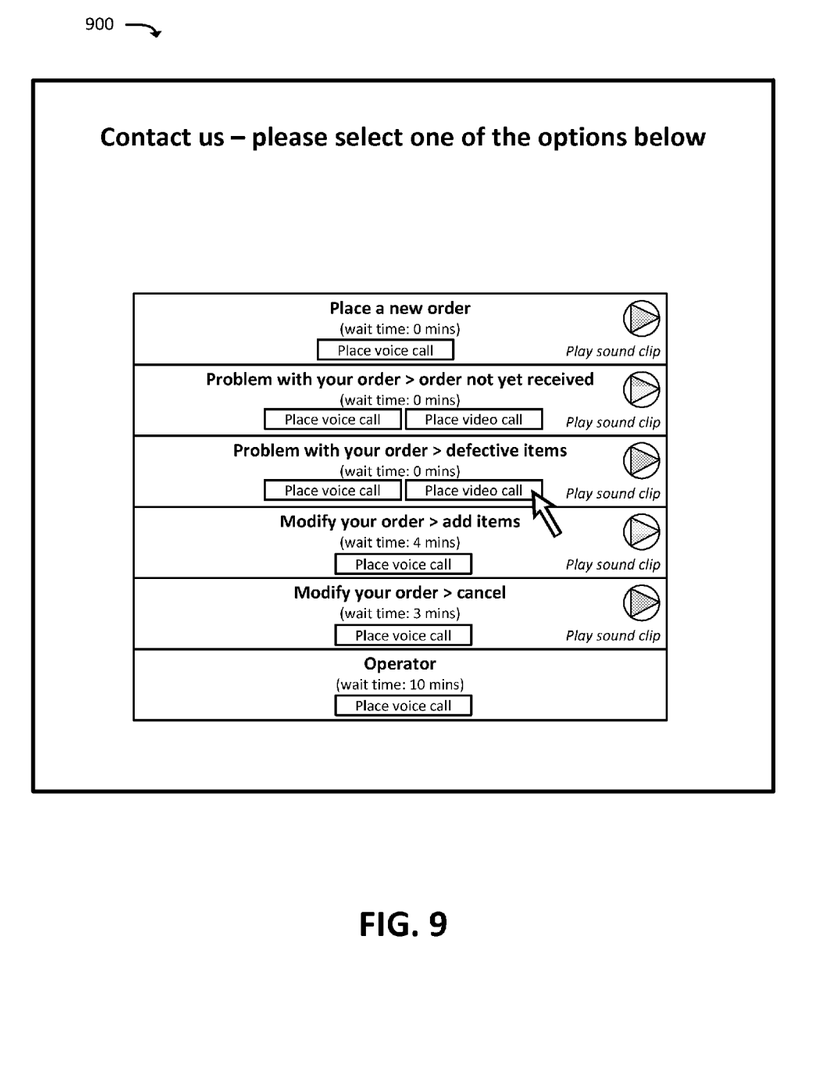
FIG. 9 illustrates another example GUI that may conveniently present contact options to a user.

FIG. 9 illustrates another example GUI 900, which may conveniently present contact options to a user. In accordance with some implementations, GUI 900 may simultaneously display multiple possible call center contacts. For example, the displayed call center contacts may correspond to all possible contacts in a menu configuration. In this manner, a user may be presented at once with every calling option that the user could potentially choose. As shown, each particular option may also include an indication as to the choices, which would, in a traditional IVR system, have led a user to the particular option. For example, the "order not yet received" option may also include the text "Problem with your order >", which may provide the user with additional insight about the particular option.

As further shown, each option may display a wait time associated with the option. For instance, the "defective items" option may have a wait time of 0 minutes, whereas the "add items" option may have a wait time of 4 minutes. As additionally shown, different calling options may be available. For instance, the contact for "place a new order" may only have voice capability, while the contact for "order not yet received" may have voice and video capability. Based on these capabilities (for instance, based on capability information stored by call center web server 410), GUI 900 may include selectable user interface options (e.g., buttons), which a user may use to place particular types of calls to intended contacts.

Further, in some implementations, some or all of the options shown in FIG. 9 may be associated with a sound clip. These sound clips may, in traditional IVR systems, be associated with particular options. GUI 900 may, in some implementations, include some or all of these clips in a manner that indicates which clips are associated with which options. For instance, as shown, a particular display area associated with a particular call center contact may include a "play" button (indicated by a circle with a shaded triangle), which a user may select in order to play the respective sound clip.

Figure 10:
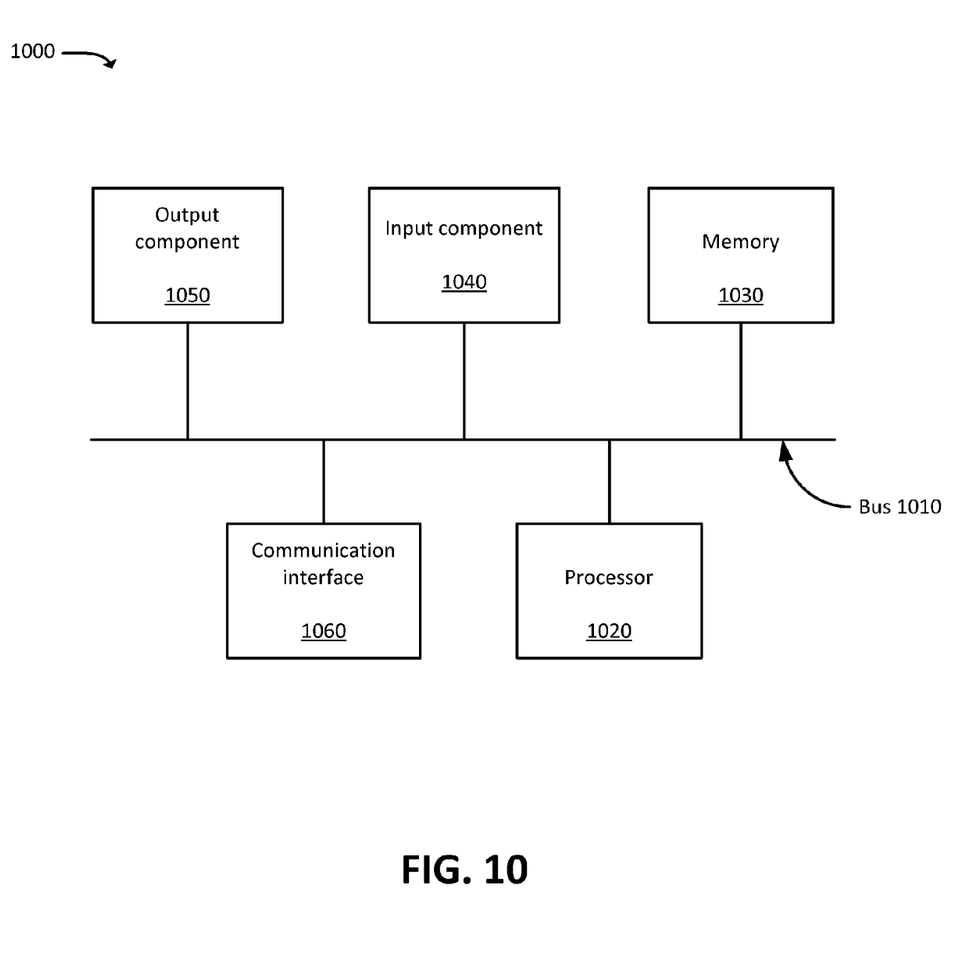
FIG. 10 illustrates example components of one or more devices, according to one or more implementations described herein.

FIG. 10 is a diagram of example components of device 1000. One or more of the devices illustrated in FIG. 5 may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth radio, a wireless LAN ("WLAN") transceiver, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6-8, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a server device, information regarding a call center, the information including an interactive voice response ("IVR") menu configuration that includes:
      contact information for a plurality of contacts associated with the call center, and
      audible options to place a call to the plurality of contacts via the contact information for the plurality of contacts;
   parsing, by the server device, the IVR menu configuration to generate a graphical user interface ("GUI") menu configuration, the GUI menu configuration comprising one or more visual selectable options that correspond to one or more of the audible options,
   wherein a selection of a particular one of the visual selectable options causes a call to be placed to a particular contact that is associated with the particular visual selectable option; and
   storing or outputting, by the server device, the GUI menu configuration.

2. The method of claim 1, wherein parsing the IVR menu configuration to generate the GUI menu configuration includes:
   identifying a plurality of duplicate audible options, in the IVR menu configuration; and
   consolidating the plurality of duplicate audible options to a single visual selectable option.

3. The method of claim 2, wherein identifying the plurality of duplicate audible options includes:
   identifying two or more audible options that are associated with a same contact, of the plurality of contacts.

4. The method of claim 1, wherein parsing the IVR menu configuration to generate the GUI menu configuration includes:
   identifying a particular option, in the IVR menu configuration, that corresponds to invalid user input being received; and
   omitting the particular option when generating the GUI menu configuration.

5. The method of claim 1, wherein parsing the IVR menu configuration to generate the GUI menu configuration includes:
   identifying a particular option, in the IVR menu configuration, that corresponds to a duration of time during which a selection of an option, in the IVR menu, has not been received; and
   omitting the particular option when generating the GUI menu configuration.

6. The method of claim 1, wherein parsing the IVR menu configuration to generate the GUI menu configuration includes:
   identifying a particular option, in the IVR menu configuration, that corresponds to a previously presented menu or option; and
   omitting the particular option when generating the GUI menu configuration.

7. The method of claim 1, wherein outputting the GUI menu configuration includes:
   outputting the GUI menu configuration to a user device based on a request from the user device for contact information regarding the call center.

8. The method of claim 1, further comprising:
   receiving information regarding average expected wait times, associated with one or more of the contacts,
   wherein the GUI menu configuration includes the received information regarding the average expected wait times.

9. The method of claim 1, wherein the GUI menu configuration specifies a GUI that simultaneously displays a selectable option to call at least two of the contacts, of the plurality of contacts.

10. The method of claim 1, wherein the IVR menu configuration is in the form of an extensible markup language ("XML") document, wherein parsing the IVR menu configuration includes parsing the XML document.

11. A server device, comprising:
    a memory device storing a set of computer-executable instructions; and
    one or more processors configured to execute the computer-executable instructions, wherein executing the computer-executable instructions causes the one or more processors to:
       receive information regarding a call center, the information including an interactive voice response ("IVR") menu configuration, the IVR menu configuration being a configuration of an IVR menu system implemented by the call center, the IVR menu configuration including:
contact information for a plurality of contacts associated with the call center, and
audible options to place a call to the plurality of contacts via the contact information for the plurality of contacts;

parse the IVR menu configuration to generate a graphical user interface ("GUI") menu configuration, the GUI menu configuration comprising one or more visual selectable options that correspond to one or more of the audible options, wherein a selection of a particular one of the visual selectable options causes a call to be placed to a particular contact that is associated with the particular visual selectable option; and store or output, by the server device, the GUI menu configuration.

12. The server device of claim 11, wherein the instructions that cause the one or more processors to parse the IVR menu configuration to generate the GUI menu configuration further cause the one or more processors to:
identify a plurality of duplicate audible options, in the IVR menu configuration; and
consolidate the plurality of duplicate audible options to a single visual selectable option.

13. The server device of claim 11, wherein the instructions that cause the one or more processors to parse the IVR menu configuration to generate the GUI menu configuration further cause the one or more processors to:
identify a particular option, in the IVR menu configuration, that corresponds to invalid user input being received; and
omit the particular option when generating the GUI menu configuration.

14. The server device of claim 11, wherein the instructions that cause the one or more processors to parse the IVR menu configuration to generate the GUI menu configuration further cause the one or more processors to:
identify a particular option, in the IVR menu configuration, that corresponds to a duration of time during which a selection of an option, in the IVR menu, has not been received; and
omit the particular option when generating the GUI menu configuration.

15. The server device of claim 11, wherein the instructions that cause the one or more processors to parse the IVR menu configuration to generate the GUI menu configuration further cause the one or more processors to:
identify a particular option, in the IVR menu configuration, that corresponds to a previously presented menu or option; and
omit the particular option when generating the GUI menu configuration.

16. The server device of claim 11, wherein executing the instructions further causes the one or more processors to:
receive information regarding average expected wait times, associated with one or more of the contacts,
wherein the GUI menu configuration includes the received information regarding the average expected wait times.

17. The server device of claim 11, wherein the GUI menu configuration specifies a GUI that simultaneously displays a selectable option to call at least two of the contacts, of the plurality of contacts.

18. A non-transitory computer-readable medium, comprising:
a plurality of computer-executable instructions stored thereon, which, when executed by one or more processors, cause the one or more processors to:
receive information regarding a call center, the information including an interactive voice response ("IVR") menu configuration, the IVR menu configuration being a same IVR menu configuration as is used by an IVR system to route calls based on audibly-presented menus;
parse the IVR menu configuration to generate a graphical user interface ("GUI") menu configuration, the GUI menu configuration comprising one or more visual selectable options that correspond to one or more audible options that are associated with the IVR menu configuration,
wherein a selection of a particular one of the visual selectable options causes a call to be placed to a particular contact that is associated with the particular visual selectable option; and
store or output, by the server device, the GUI menu configuration.

19. The non-transitory computer-readable medium of claim 18, wherein the instructions that cause the one or more processors to parse the IVR menu configuration to generate the GUI menu configuration include instructions that further cause the one or more processors to:
identify a plurality of duplicate audible options, in the IVR menu configuration; and
consolidate the plurality of duplicate audible options to a single visual selectable option.

20. The non-transitory computer-readable medium of claim 18, wherein the instructions that cause the one or more processors to parse the IVR menu configuration to generate the GUI menu configuration include instructions that further cause the one or more processors to:
identify a particular option, in the IVR menu configuration, that corresponds to invalid user input being received; and
omit the particular option when generating the GUI menu configuration.

* * * * *